(12) United States Patent
Chinn et al.

(10) Patent No.: US 11,319,792 B2
(45) Date of Patent: May 3, 2022

(54) PROCESSES AND SYSTEMS FOR HIGH $H_2S$ GAS PROCESSING HAVING REDUCED SULFUR PRODUCTION

(71) Applicant: Chevron U.S.A. Inc., San Ramon, CA (US)

(72) Inventors: Daniel Chinn, Danville, CA (US); Brent A. Hetrick, Sugar Land, TX (US); Nitesh Bhuwania, Richmond, CA (US); Shabbir Husain, Houston, TX (US); Sam J. Mishael, Bellaire, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 471 days.

(21) Appl. No.: 16/441,089

(22) Filed: Jun. 14, 2019

(65) Prior Publication Data

US 2019/0383128 A1 Dec. 19, 2019

Related U.S. Application Data

(60) Provisional application No. 62/685,452, filed on Jun. 15, 2018.

(51) Int. Cl.
  *B01D 53/14* (2006.01)
  *C01B 17/04* (2006.01)
  (Continued)

(52) U.S. Cl.
  CPC .......... *E21B 43/40* (2013.01); *B01D 53/1468* (2013.01); *C01B 17/0404* (2013.01);
  (Continued)

(58) Field of Classification Search
  CPC .......... B01D 2252/204; B01D 2256/24; B01D 2257/304; B01D 53/1468; C01B 17/0404; E21B 41/0057; E21B 43/168; E21B 43/40
  See application file for complete search history.

(56) References Cited

U.S. PATENT DOCUMENTS

| | | | |
|---|---|---|---|
| 6,053,965 | A | 4/2000 | Lokhandwala |
| 6,630,011 | B1 | 10/2003 | Baker et al. |

(Continued)

OTHER PUBLICATIONS

Ahmed S. Abou-Sayed, et al., "The Management of Sour Gas by Underground Injection-Assessment, Challenges and Recommendations," SPE 86605, Paper presented at the SPE International Conference on Health, Safety, and Environment in Oil and Gas Exploration and Production, Calgary, Alberta, Canada, Mar. 2004.

(Continued)

*Primary Examiner* — Cabrena Holecek
(74) *Attorney, Agent, or Firm* — Jason M. Guerrero

(57) ABSTRACT

Disclosed are methods and systems for reducing elemental sulfur production in a gas production plant that includes receiving produced fluids high in hydrogen sulfide, removing hydrogen sulfide and converting hydrogen sulfide to elemental sulfur in a Claus unit. An acid gas stream is diverted from a feed line to the Claus unit in the gas processing plant and directed to a multistage acid gas compressor. An elemental sulfur production rate is reduced without reducing a production rate of the produced fluids. The compressed acid gas stream can be injected into a subterranean formation. In some embodiments, the gas production plant is integrated with an oil processing and gas injection plant.

15 Claims, 7 Drawing Sheets

(51) Int. Cl.
*E21B 41/00* (2006.01)
*E21B 43/16* (2006.01)
*E21B 43/40* (2006.01)

(52) U.S. Cl.
CPC ........ *E21B 41/0057* (2013.01); *E21B 43/168* (2013.01); *B01D 2252/204* (2013.01)

(56) References Cited

U.S. PATENT DOCUMENTS

| | | |
|---|---|---|
| 6,932,859 B2 | 8/2005 | Koros et al. |
| 7,247,191 B2 | 7/2007 | Koros et al. |
| 8,869,890 B2 | 10/2014 | Chinn et al. |
| 2010/0186586 A1 | 7/2010 | Chinn et al. |
| 2010/0251613 A1* | 10/2010 | Thacker ............... B01D 53/526 48/76 |
| 2012/0168154 A1 | 7/2012 | Chinn et al. |
| 2016/0090910 A1 | 3/2016 | Ploeger et al. |
| 2018/0363978 A1 | 12/2018 | Ballaguet et al. |
| 2019/0105600 A1 | 7/2019 | Chinn et al. |

OTHER PUBLICATIONS

A.S. Abou-Sayed, et al., "An Assessment of Engineering, Economical and Environmental Drives of Sour Gas Management by Injection," SPE 97628, This paper was prepared for presentation at the SPE International Improved Oil Recovery Conference in Asia Pacific, Kuala Lumpur, Malaysia, Dec. 5-6, 2005.

T.M.Bekirov, "Primary processing of natural gases," Moscow: Chemistry, 1987.256 p. (in Russian).

N.V. Bobritsky & V.A. Yufin, "Fundamentals of the Oil and Gas Industry," p. 83.

"State Standard of the Republic of Kazakhstan Oil Industry," Terminology, Part 1. Raw Materials and Products St. RK ISO, 1998-1-2004 (ISO 1998-1: 1998, IDT) [ST RK ISO 1998-1-2004 (ISO 1998-1: 1998, IDT)].

* cited by examiner

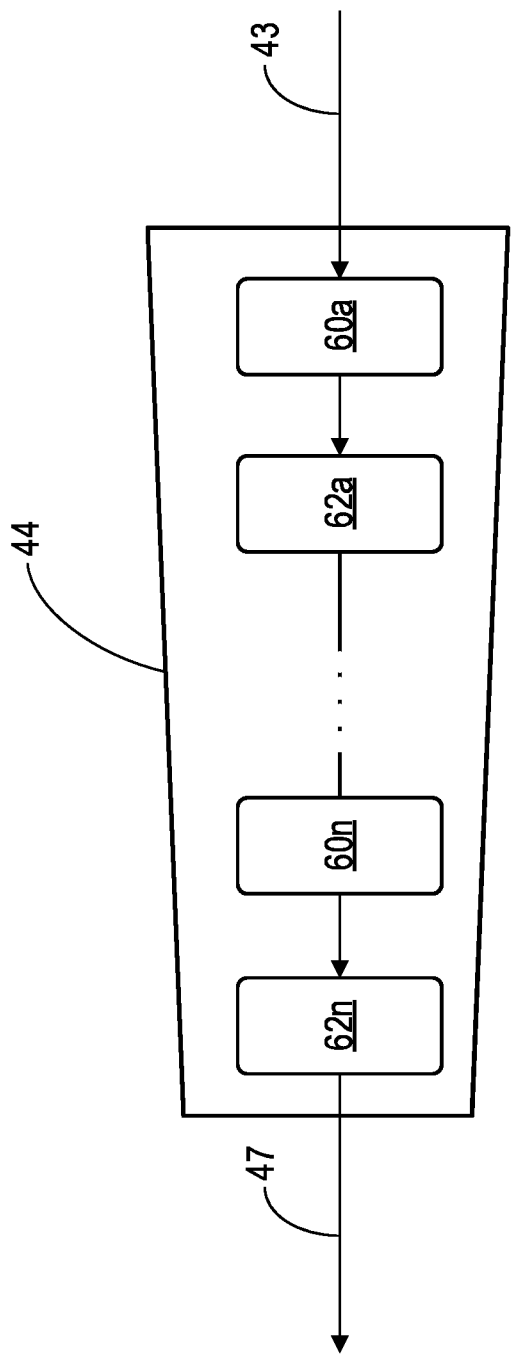

PROCESSES AND SYSTEMS FOR HIGH $H_2S$ GAS PROCESSING HAVING REDUCED SULFUR PRODUCTION

CROSS REFERENCES TO RELATED APPLICATIONS

This application claims benefit under 35 USC 119 of U.S. Provisional Patent Application No. 62/685,452 with a filing date of Jun. 15, 2018, 2015, which is incorporated herein by reference in its entirety.

FIELD

The present disclosure relates generally to the field of processing of gas containing high levels of hydrogen sulfide. The present disclosure further relates to injection of acid gas for enhanced oil recovery at facilities that process oil and/or gas containing high levels of hydrogen sulfide.

BACKGROUND

Production of oil and/or gas fields with high amounts of hydrogen sulfide ($H_2S$) are challenging in that $H_2S$ needs to be separated from both the produced oil and natural gas and safely disposed of There are at least two widely-practiced methods of processing natural gas with high $H_2S$. For one, the entire $H_2S$-containing natural gas stream, also referred to as "sour gas," may be dehydrated, compressed, and reinjected at high pressure in an underground formation. This is illustrated in FIG. 1 depicting a facility known in the prior art for managing high $H_2S$ in oil and gas production. As shown, production fluids 1 are fed to an upstream separator 2 (also referred to as a slug catcher) and separated into a sour gas stream 3, a sour oil stream 4 and produced water 5. All of the sour gas 3 can be sent in stream 27 for compression in compressor 35, followed by sour gas dehydration in dehydration unit 38. The dry sour gas 39 can then be injected (also referred to as reinjected) into an underground formation (not shown) by injection unit 40.

For another, the sour gas 3 may be processed using amine scrubbing, e.g., in medium pressure amine unit 17 and high-pressure amine unit 19, to form a sweet gas stream 20. The sweet gas stream 20 can be further processed by dehydration and fractionation (not shown) to extract propane and butane+ prior to being sold as sales gas containing mostly methane, ethane, and some nitrogen. The $H_2S$ and $CO_2$ removed during gas processing, also referred to as "acid gas," can be sent as acid gas stream 21 to a Sulfur Recovery Unit (SRU) also referred to as a Claus unit 22, where the $H_2S$ is converted to elemental sulfur via the well-known Claus reaction.

Sour oil processing is a bit more straightforward. After separation from the gas 3 and water 5 from three-phase upstream separator 2, the oil stream 4 is often flashed in one or more stages to remove light components (including $H_2S$) and then further stabilized in a crude stabilizer column.

To maintain plant flexibility and to boost overall production, facilities often install parallel trains and oil production with sour gas processing along with sour gas injection. Still referring to FIG. 1, sour oil stream 4 is directed to two separate plants, oil and/or gas processing plant 24 and oil processing and gas injection plant 26. Plants 24 and 26 can be run to process sour gas and sour oil taken from the same upstream separator 2. As shown, sour gas stream 3 can be compressed in a compressor (also referred to as a pressure boost facility) 6 to form a compressed stream 8 having a pressure to match the inlet pressure of the oil and/or gas processing plant 24. Sour crude stream 4 can be pumped by pump 7 to form unstabilized oil stream 9 which can then be combined with the compressed stream 8 to form a multi-phase stream 10. Sour gas stream 27 can be diverted from sour gas stream 3 to feed plant 26. Likewise, sour oil stream 28 can be diverted from sour oil stream 4 to feed plant 26.

In oil and/or gas processing plant 24, multiphase feed stream 10 is sent to a series of high-pressure (HP), medium-pressure (MP), and low-pressure (LP) separators 11, 12 and 13, respectively, to separate gas from oil, and lastly to a crude stabilizer column 14 which further strips more light ends and $H_2S$ from the oil in an overhead flash gas stream 15 to meet a final vapor-pressure specification on the product oil leaving the stabilizer 14. All of the gases from the flash steps (i.e., the separators 11, 12 and 13) along with the stabilizer overhead gases 15 may be combined, recompressed, and mixed to feed MP amine unit 17 and HP amine unit 19. The gas from the HP separator 11 is sent to a HP amine unit 19 which produces a HP sweet gas stream 20 along with a low-pressure acid gas stream 21. The flash gases from the stabilizer overhead 15 is compressed by compressor 16 and mixed with the overhead gas from the MP separator 12 to feed into the MP amine unit 17. Sweet gas from the MP unit 17 may be compressed by compressor 18 and mixed with the HP sweet gas 20 if $H_2S$ specifications are met, or diverted to the HP Amine unit 19 if the $H_2S$ specifications are not met.

In oil processing and gas injection plant 26, sour oil stream 28 can be sent to multiple stages of separators, e.g., as shown, medium pressure separator 29 and low-pressure separator 30, followed by a crude stabilizer column 31 for producing product crude 32. Low-pressure sour gas stream 27 (i.e., taken from upstream of the pressure boost facility 6) is tied into an overhead from the medium pressure separator 29 to form stream 36 which is compressed by compressor 35. The overhead gases from the low-pressure separator 30 (low-pressure gas 37) and the crude stabilizer column 31 (low-pressure gas 33) are compressed in compressor 34. The compressed gas stream from compressor 35 is sent to a sour gas dehydration unit 38, and the dry sour gas 39 is sent to a sour gas compression and injection unit 40 where it is further compressed and injected.

Limitations and challenges exist in such facilities, e.g., as shown in FIG. 1. The inlet gas/oil ratio (GOR) and % $H_2S$ in well production fluids tend to increase over time as a reservoir ages and with prolonged sour gas injection. Facilities are designed with finite limits on $H_2S$ treating and sulfur conversion capacity along with sour gas injection capacity. Reservoir pressure drops over time. When market prices for the treated natural gas are low, oil production becomes the main revenue source for such facilities. Oil production however, becomes constrained by the facility's ability to handle the sour gas, either by processing or by injection. There are times when there is a strong environmental and economic incentive to reduce the production of elemental sulfur, even for facilities that are equipped with Claus plants and sour-gas injection facilities. There exists a need for reducing the production of elemental sulfur without impairing oil and/or gas production of the overall facility.

SUMMARY

In one aspect, the disclosure generally relates to systems for reducing elemental sulfur production in a gas production plant that includes receiving produced fluids high in hydrogen sulfide, removing hydrogen sulfide and converting hydrogen sulfide to elemental sulfur. The systems include a gas processing plant for receiving a feed stream comprising gas containing from 4 ppm to 60% hydrogen sulfide by volume, wherein the gas processing plant includes at least one amine unit for removing hydrogen sulfide from the feed stream, and a Claus unit connected to a hydrogen sulfide gas outlet of the at least one amine unit for receiving a Claus unit feed containing from 50 to 85% hydrogen sulfide by volume and producing elemental sulfur. The system also includes piping for diverting an acid gas stream from a feed line to the Claus unit in the gas processing plant and directing the diverted acid gas stream to an acid gas compressor having multiple stages and multiple after-coolers after each stage for increasing a pressure of the diverted acid gas stream and forming a compressed acid gas stream. An elemental sulfur production rate is reduced without reducing a production rate of the produced fluids.

In another aspect, the disclosure can generally relate to methods for reducing elemental sulfur production in a gas production plant that includes receiving produced fluids high in hydrogen sulfide, removing hydrogen sulfide and converting hydrogen sulfide to elemental sulfur. The methods include receiving a feed stream comprising gas containing from 4 ppm to 60% hydrogen sulfide by volume and removing hydrogen sulfide from the feed stream in at least one amine unit to produce a sweet gas stream and an acid gas stream containing from 50 to 85% hydrogen sulfide by volume, producing elemental sulfur from the acid gas stream in a Claus unit connected to the at least one amine unit by a feed line to the Claus unit, diverting an acid gas stream from the feed line to the Claus unit to an acid gas compressor having multiple stages and multiple after-coolers after each stage, and increasing a pressure of the diverted acid gas stream in the acid gas compressor to form a compressed acid gas stream. An elemental sulfur production rate is reduced without reducing a production rate of the produced fluids.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

FIG. 7 is a schematic diagram of an acid gas compressor having multiple stages and multiple after-coolers after each stage for increasing a pressure of a diverted acid gas stream and forming a compressed acid gas stream.

DETAILED DESCRIPTION

Figure 1:
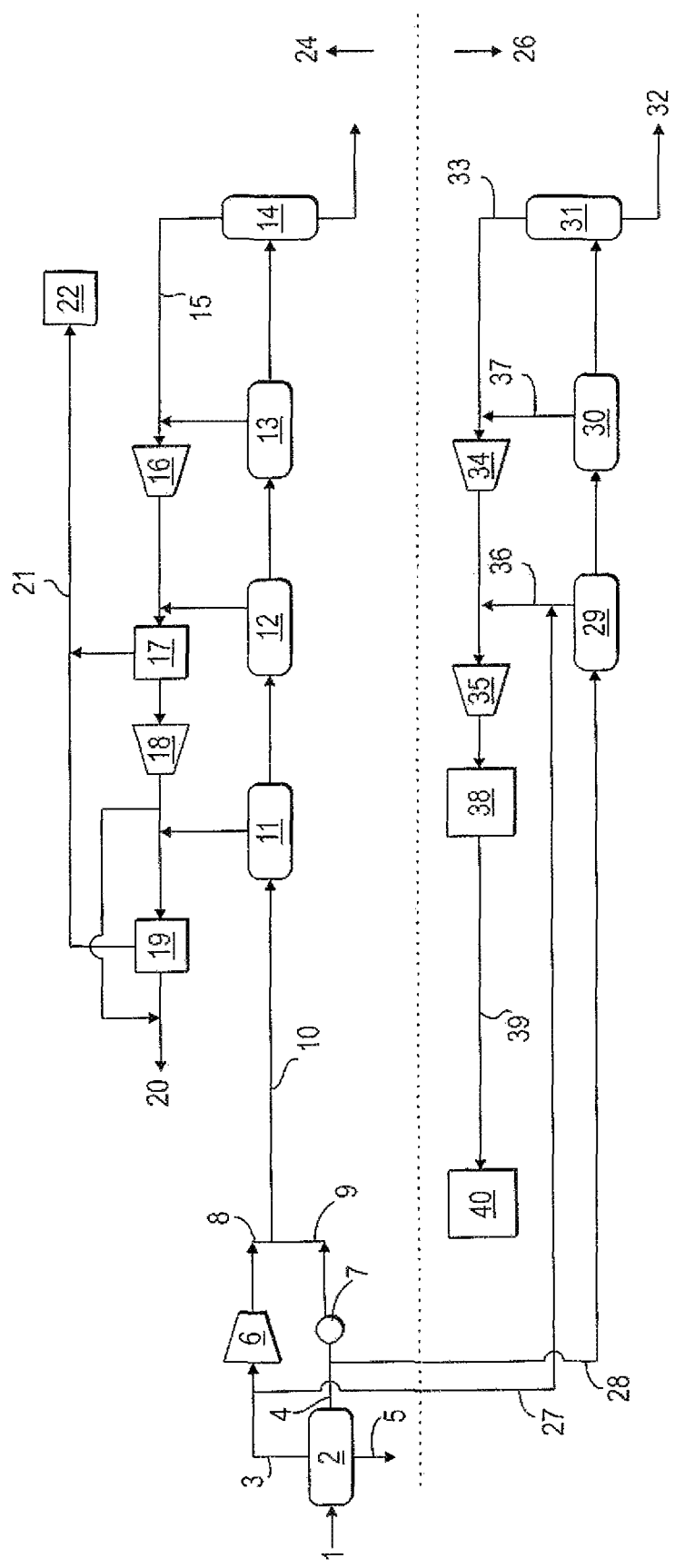
FIG. 1 is a schematic diagram of a process for managing high $H_2S$ in oil and gas production known in the prior art.
Figure 2:
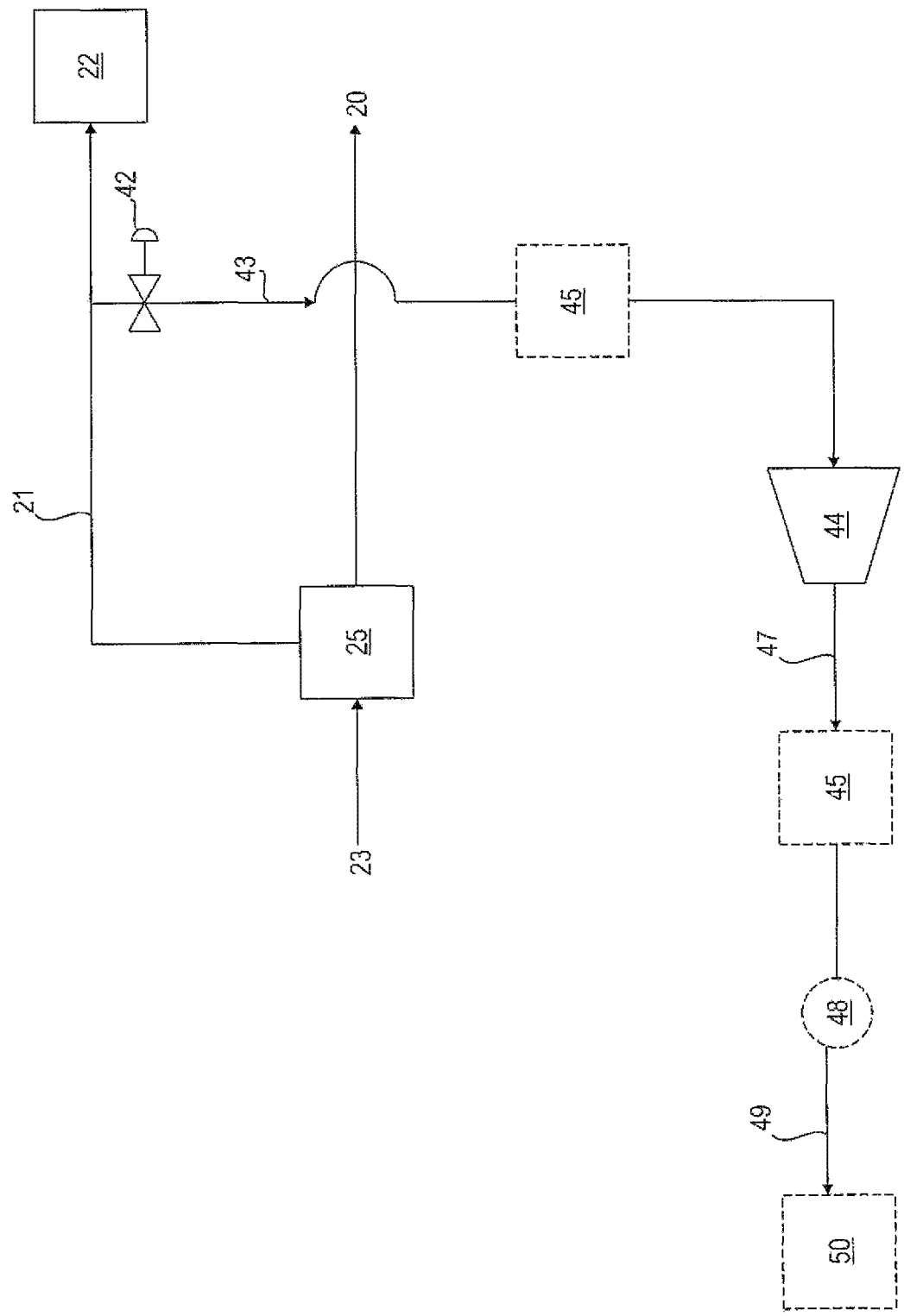
FIG. 2 is a schematic diagram of a process for managing high $H_2S$ in gas production in accordance with certain example embodiments wherein acid gas is diverted from a feed to a Claus unit and compressed.

In one embodiment, referring to FIG. 2, a sour gas feed 23 for receiving a feed stream comprising gas containing from 4 ppm to 60% hydrogen sulfide by volume is fed to at least one amine unit 25 for sweetening the sour gas 23. Sweet gas stream 20 is thereby produced. Acid gas stream 21 contains the H2S and CO2 removed from the sour gas 23. In one embodiment, acid gas stream 21 contains from 50 to 85% hydrogen sulfide by volume. Acid gas stream 21 is removed from the amine unit 25 and fed to the Claus unit 22. A control valve 42 can be used for diverting an acid gas stream 43 from the acid gas stream 21. In one embodiment, the diverted acid gas stream 43 is compressed in acid gas compressor 44 to form a compressed acid gas stream 47 having a pressure of from 60 to 80 bar. As shown in FIG. 7, the acid gas compressor 44 has multiple stages 60 and multiple after-coolers 62 after each stage 60 for increasing a pressure of the diverted acid gas stream 43 and forming the compressed acid gas stream 47. Optional dehydration unit 45 can be located upstream or downstream of the acid gas compressor 44. The process flow diagram shown in FIG. 2 can be a portion of a larger oil and/or gas processing plant, for instance, including oil processing and multiple amine units such as that shown in FIG. 1. As can be seen, at least some of the acid gas that would otherwise go to the Claus unit 22 is diverted. Advantageously, Claus unit capacity limits which often bottleneck oil and/or sweet gas production can be eliminated as a limiting factor. Furthermore, the amount of elemental sulfur produced can be reduced, e.g., by from 25% to 50%.

In one embodiment, the acid gas compressor 44 is used to raise the pressure of the acid gas stream 43 to a sufficiently high pressure that the compressed acid gas stream 47 is a dense phase fluid. Dense phase fluid is a fluid having a viscosity similar to that of a gas, but having a density closer to that of a liquid. In the dense phase, it is unlikely that water in the acid gas stream will condense out as a liquid phase, thus avoiding corrosion concerns and allowing less expensive carbon steel or steel with less than 5% alloy content to be used in the piping for transmitting the compressed acid gas stream 47. A dense phase fluid pump 48 can be used to pump the dense phase fluid 49 as a liquid is pumped to an acid gas injection unit 50 for injection into a subterranean formation. In one embodiment, the dense phase fluid pump 48 can have a suction pressure of from 850 to 950 psig, and a discharge pressure of from 2850 to 2950 psig. Purge gas seals (not shown) can be used to keep oxygen out of the piping.

In this embodiment, the $H_2S$ can be concentrated to the point that the acid gas injection is expected to have an enhanced oil recovery (EOR) effect. Therefore, the disposal of the injected acid gas stream can advantageously result in increased oil recovery.

Figure 3:
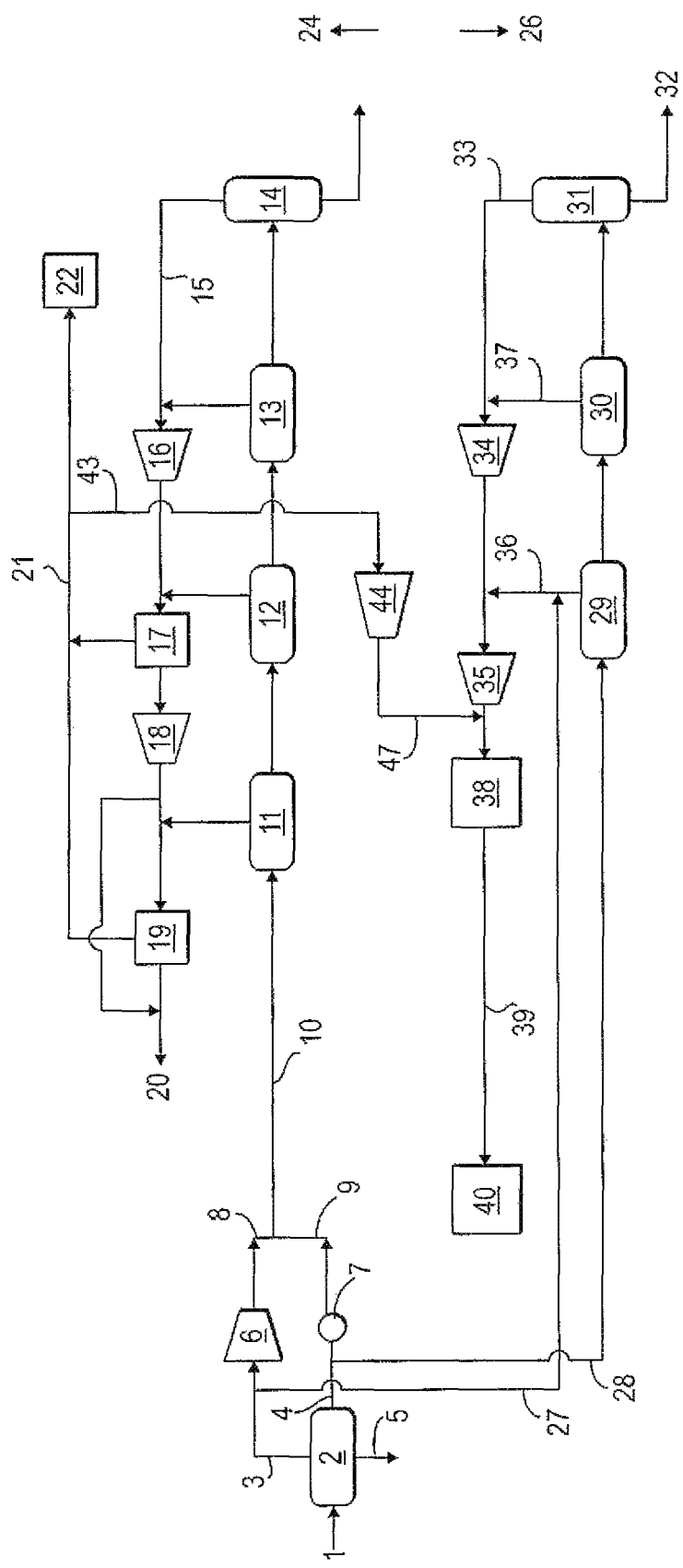
FIG. 3 is a schematic diagram of a process for managing high $H_2S$ in oil and gas production in accordance with certain example embodiments wherein acid gas is diverted from a feed to a Claus unit and combined with sour gas in an oil processing plant for sour gas compression and injection.

FIG. 3 illustrates one embodiment which, like the prior art facility shown in FIG. 1, includes an upstream portion including an upstream separator 2, an oil and gas processing plant 24 and an oil processing and gas injection plant 26. A portion of the acid gas from plant 24 is diverted away from the Claus unit 22 and sent to a dedicated acid gas compressor 44 located near the oil processing and gas injection plant 26, i.e., between plants 24 and 26. The acid gas compressor 44 raises the pressure of the diverted acid gas stream 43 so that it may be mixed with the inlet feed to the sour gas dehydration unit 38 in plant 26. The initial pressure of diverted acid gas stream 43 can be, for example, from 1.3 to 2 bar. After compression, the acid gas stream 47 can have a pressure to match the sour gas dehydration pressure, e.g., from 60 to 80 bar. The dry, sour gas 39 is sent to a sour gas compression and injection unit 40 for additional compression to 300-500 bar and for injection into an injection well in a subterranean formation (not shown). The amount of elemental sulfur produced can be greatly reduced compared to the prior art facility of FIG. 1. Another advantage compared to the prior art of FIG. 1 is that the % $H_2S$ in the sour gas injected is higher. This may provide additional advantages of increased oil recovery.

Figure 4:
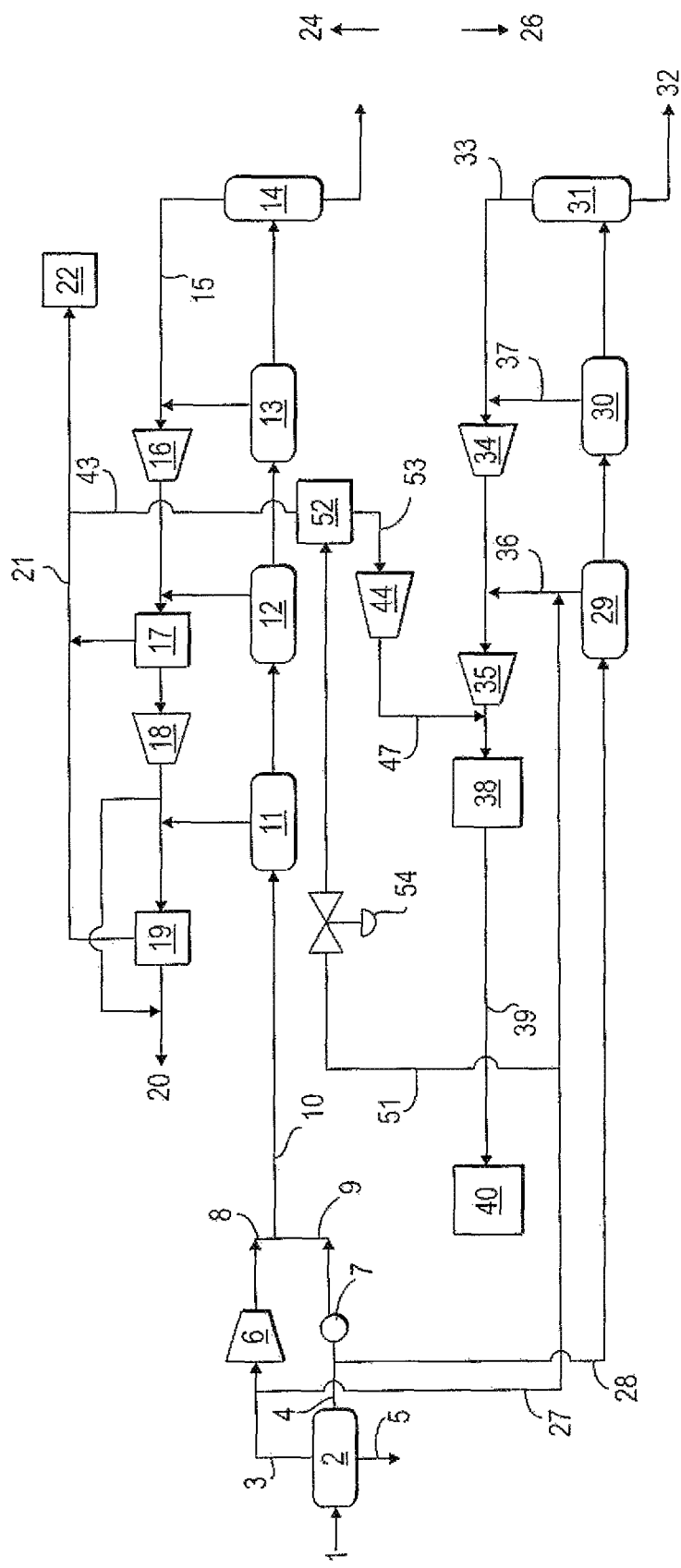
FIG. 4 is a schematic diagram of a process for managing high $H_2S$ in oil and gas production in accordance with certain example embodiments wherein acid gas is diverted from a feed to a Claus unit and fed to an eductor and wherein a low-pressure sour gas stream is also fed to the eductor.

In one embodiment, as shown in FIG. 4, a portion of the sour gas stream 27 going to plant 26 is diverted as sour gas stream 51. Sour gas stream 51 is mixed with the diverted acid gas stream 43 in a gas eductor 52. Eductors are static venturi devices in which a high-pressure motive gas stream is used to boost the pressure of a lower pressure gas stream with no moving parts. Eductors can typically recover about 40% of the pressure drop between the higher pressure and lower pressure streams. The eductor 52 has a suction inlet for receiving the lower pressure diverted acid gas stream 43, a motive inlet for receiving the higher pressure sour gas stream 51, and an outlet for discharging an intermediate-pressure stream 53. The gas eductor 52 will raise the pressure of the acid gas such that the final pressure of stream 53 leaving the eductor 52 will be much higher than the original pressure of the diverted acid gas stream 43. For example, if the acid gas stream 43 is 2 bar and the motive gas 51 is 20 bar, the eductor 52 can provide a combined gas stream 53 of a least 6 to 7 bar for the suction to the acid gas compressor 44. This embodiment provides several benefits. Firstly, the compressor load on the acid gas compressor 44 will be much lower with a higher inlet pressure. Again, if the suction pressure to the compressor increases from approximately 2 bar to 7 bar, then the horsepower is proportional to the discharge/feed pressure ratio raised to some power. For instance, if that power is 0.3, and the discharge pressure is 20 bar, then the compressor load is about 30% lower horsepower. Secondly, potentially safer handling and smaller safe processing zones (SPZ) are enabled since the $H_2S$ concentration of the diverted acid gas stream 43 is diluted by the combination with high-pressure, lower $H_2S$ stream 51. Thirdly, the load on the medium pressure compressor 35 of plant 26 may also be reduced. The outlet gas 53 from the eductor 52 is sent to the acid gas compressor 44. The compressed gas stream 47 leaving the acid gas compressor 44 is sent to the existing sour gas dehydration unit 38 of plant 26 and eventually to further compression and injection at compression and injection unit 40. In one embodiment, a control valve 54 can be used to adjust the amount of gas in line 51 being sent to the eductor 52.

Figure 5:
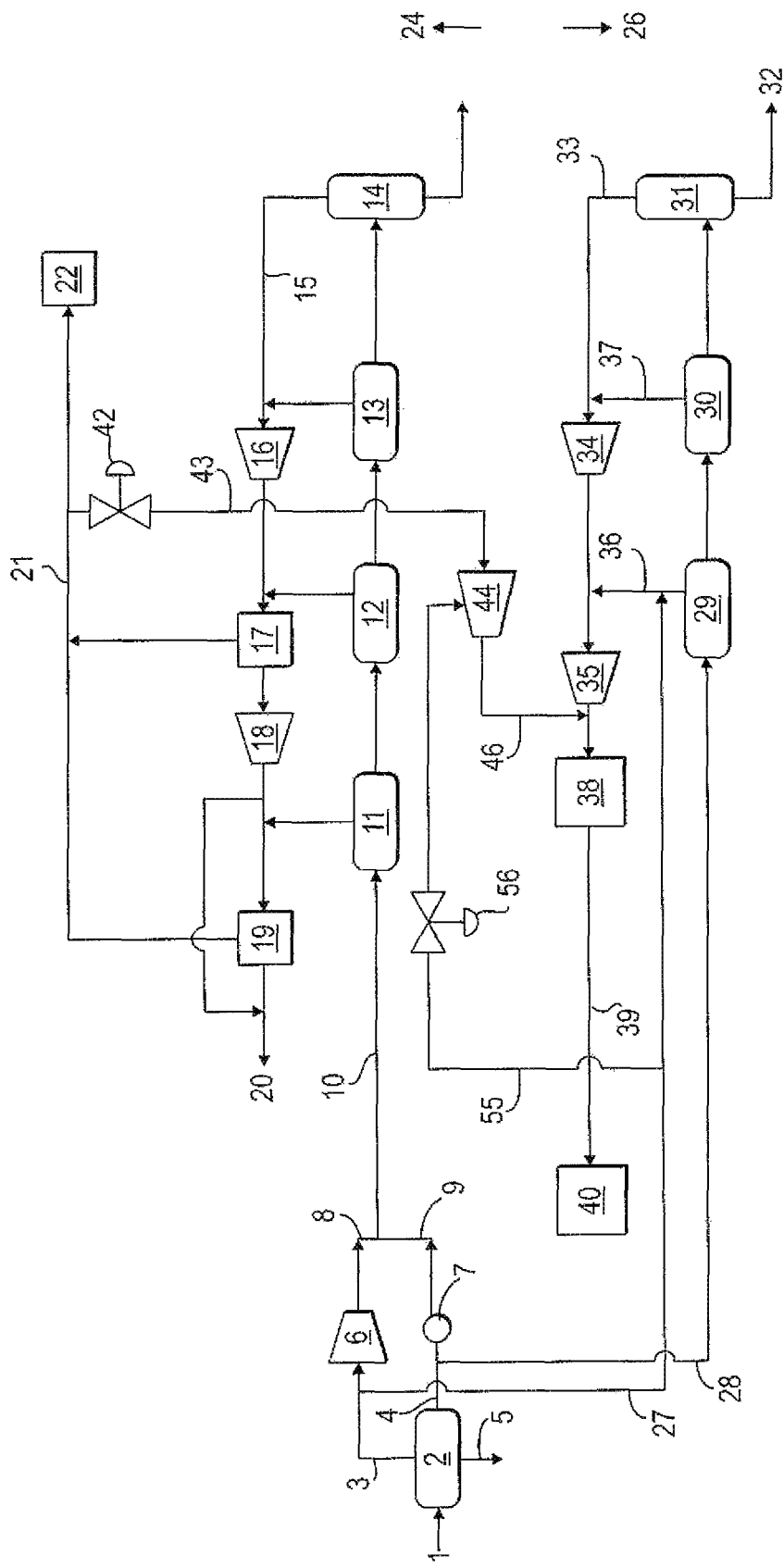
FIG. 5 is a schematic diagram of a process for managing high $H_2S$ in oil and gas production in accordance with certain example embodiments wherein acid gas is diverted from a feed to a Claus unit and compressed in a multistage compressor and wherein a low-pressure sour gas stream is fed to and intermediate stage of the multistage compressor.

In one embodiment, shown in FIG. 5, a portion of the sour gas stream 27 going to plant 26 is diverted as gas stream 55. Sour gas stream 55 is then fed to an intermediate stage of the acid gas compressor 44, thereby mixing with the diverted acid gas stream 43 in the acid gas compressor 44. The specific intermediate stage can be determined depending on the pressure of stream 55 and the desired pressure of the compressed gas stream. For example, in the scheme shown, the desired pressure should be the same as the suction pressure of the next stage after the immediate stage. As a result, a diluted compressed acid gas stream 46 is produced. For example, assuming the acid gas contains 80% $H_2S$ and the sour gas contains 15% $H_2S$, by blending in a stream of 80% sour gas to 20% acid gas, the diluted compressed acid gas stream 46 contains about 28% $H_2S$.

Advantageously, the diluted compressed acid gas stream 46 is inherently safer to transmit than acid gas that is not diluted. Again, the load on the medium pressure compressor 35 of plant 26 may be reduced as compared with the prior art system shown in FIG. 1. The diluted compressed gas stream 46 leaving the acid gas compressor 44 is sent to the sour gas dehydration unit 38 of plant 26 and eventually to further compression and injection at compression and injection unit 40. In one embodiment, a control valve 56 can be used to adjust the amount of gas in line 55 being sent to the intermediate stage of the acid gas compressor 44.

Figure 6:
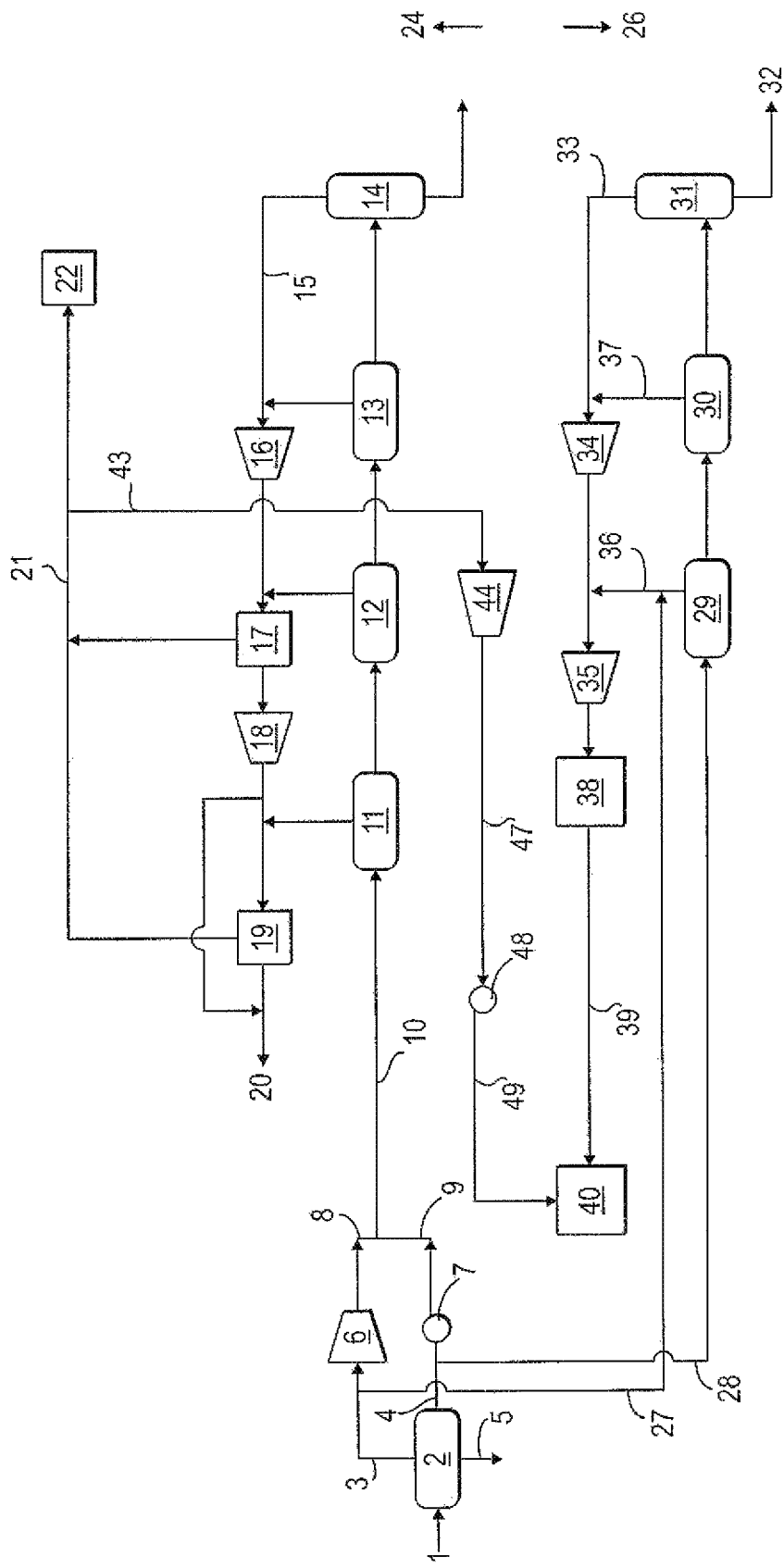
FIG. 6 is a schematic diagram of a process for managing high $H_2S$ in oil and gas production in accordance with certain example embodiments wherein acid gas is diverted from a feed to a Claus unit and compressed in a compressor to form a dense phase fluid and wherein the dense phase fluid is pumped and injected.

In one embodiment, shown in FIG. 6, the acid gas compressor 44 is used to raise the pressure of the acid gas stream 43 to a pressure where the compressed fluid 47 is dense phase. The dense phase fluid 47 can be pumped like a liquid by dense phase pump 48 to a suitable pressure for injection, e.g., 400 to 500 bar, into a subterranean formation by the sour gas compression and injection unit 40. One advantage of the process shown is that it does not add load to the sour gas dehydration unit 38 in plant 26 or to the compression and injection unit 40.

In various embodiments, control valves (e.g., 42, 54 and/or 56) can be used to adjust the amount of gas in a particular line. These control valves can be controlled responsive to a signal indicating the injection gas composition. For instance, a gas chromatography signal in an injection well can be monitored to monitor the gas composition being injected. To achieve a desired gas composition, e.g., for enhanced oil recovery, one or more of the control valves can be adjusted responsive to the signal.

Advantageously some embodiments of the present disclosure can reduce the amount of acid gas processed by the Claus unit 22, thus reducing the amount of sulfur that needs to be handled and potentially removing potential process bottlenecks such that plant capacity is not impaired.

It should be noted that only the components relevant to the disclosure are shown in the figures, and that many other components normally part of an oil and gas processing facility, gas injection facility, and hydrogen sulfide handling facility are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for reducing elemental sulfur production in a gas production plant that includes receiving produced fluids high in hydrogen sulfide, removing hydrogen sulfide and converting hydrogen sulfide to elemental sulfur, comprising:
   a. a gas processing plant for receiving a feed stream comprising gas containing from 4 ppm to 60% hydrogen sulfide by volume, wherein the gas processing plant includes:
      i. at least one amine unit for removing hydrogen sulfide from the feed stream; and
      ii. a Claus unit connected to a hydrogen sulfide gas outlet of the at least one amine unit for receiving a Claus unit feed containing from 50 to 85% hydrogen sulfide by volume and producing elemental sulfur;
   b. piping for diverting an acid gas stream from a feed line to the Claus unit in the gas processing plant and directing the diverted acid gas stream to an acid gas compressor; and
   c. the acid gas compressor having multiple stages and multiple after-coolers after each stage for increasing a pressure of the diverted acid gas stream and forming a compressed acid gas stream;
   wherein an elemental sulfur production rate is reduced without reducing a production rate of the produced fluids.

2. The system of claim 1 wherein the diverted acid gas stream is a dense phase fluid when discharged from the acid gas compressor, and further comprising a dense phase pump for pumping the dense phase fluid.

3. The system of claim 2 further comprising an acid gas injection unit through which the dense phase fluid is pumped into an acid gas injection well.

4. The system of claim 1 further comprising an acid gas injection unit for injecting the compressed acid gas stream into a subterranean formation.

5. The system of claim 1 further comprising an upstream separator for separating produced fluids from a subterranean reservoir into an associated gas stream, an oil stream and a water stream; and an oil processing and gas injection plant for receiving a portion of the associated gas stream and a portion of an oil stream from the upstream separator, wherein the oil processing and gas injection plant comprises:
   a. at least one gas-oil separator for receiving the portion of the oil stream from the upstream separator;
   b. at least one compressor for increasing a pressure of one or more gas streams as separated by the at least one gas-oil separator to form a compressed sour gas stream;
   c. at least one stabilizer for removing dissolved gases including hydrogen sulfide from the oil stream wherein the removed dissolved gases are compressed in the at least one compressor;
   d. piping for feeding the portion of the associated gas stream from the upstream separator to a most downstream compressor of the at least one compressors such that the compressed sour gas stream and the portion of the associated gas stream are combined to form a compressed sour gas injection unit feed stream; and
   e. a sour gas injection unit for injecting a portion of the compressed sour gas injection unit feed stream into a subterranean formation.

6. The system of claim 5 further comprising an eductor for receiving a portion of the associated gas stream from the upstream separator as a high pressure stream and the diverted acid gas stream from the feed line to the Claus unit as a low pressure stream such that a pressure-boosted stream leaves the eductor and is fed to the acid gas compressor, wherein the pressure-boosted stream has a lower concentration of hydrogen sulfide than the diverted acid gas stream.

7. The system of claim 5 wherein a portion of the portion of the associated gas stream from the upstream separator is fed to an intermediate stage of the acid gas compressor wherein a stream leaving the acid gas compressor has a lower concentration of hydrogen sulfide than the diverted acid gas stream, a pressure to match the compressed sour gas injection unit feed stream and wherein the stream leaving the acid gas compressor is combined with the compressed sour gas injection unit feed stream to form a stream to be injected into the subterranean formation.

8. The system of claim 4, 6 or 7 further comprising a control system for controlling a composition of a stream to be injected into the subterranean formation to achieve a desired composition for enhanced oil recovery, wherein the control system comprises a control valve for adjusting an amount of acid gas stream to be diverted, a control valve for adjusting an amount of the portion of the portion of the associated gas stream from the upstream separator fed to an intermediate stage of the acid gas compressor, and/or a control valve for adjusting an amount of the portion of the associated gas stream from the upstream separator as the high pressure stream received by the eductor.

9. A method for reducing elemental sulfur production in a gas production plant that includes receiving produced fluids high in hydrogen sulfide, removing hydrogen sulfide and converting hydrogen sulfide to elemental sulfur, comprising:
   a. receiving a feed stream comprising gas containing from 4 ppm to 60% hydrogen sulfide by volume and removing hydrogen sulfide from the feed stream in at least one amine unit to produce a sweet gas stream and an acid gas stream containing from 50 to 85% hydrogen sulfide by volume;
   b. producing elemental sulfur from the acid gas stream in a Claus unit connected to the at least one amine unit by a feed line to the Claus unit;

c. diverting an acid gas stream from the feed line to the Claus unit to an acid gas compressor having multiple stages and multiple after-coolers after each stage; and d. increasing a pressure of the diverted acid gas stream in the acid gas compressor to form a compressed acid gas stream;

wherein an elemental sulfur production rate is reduced without reducing a production rate of the produced fluids.

10. The method of claim 9 wherein the diverted acid gas stream is a dense phase fluid when discharged from the acid gas compressor, and further comprising pumping the dense phase fluid into the subterranean formation through an injection well.

11. The method of claim 9 further comprising injecting the compressed acid gas stream into a subterranean formation.

12. The method of claim 9 further comprising separating produced fluids from a subterranean reservoir into an associated gas stream containing from 4 ppm to 60% hydrogen sulfide by volume, an oil stream and a water stream in an upstream separator; and receiving a portion of the associated gas stream and a portion of the oil stream from the upstream separator in an oil processing and gas injection plant, wherein the oil processing and gas injection plant comprises:

a. at least one gas-oil separator for receiving the portion of the oil stream from the upstream separator;

b. at least one compressor for increasing a pressure of one or more gas streams as separated by the at least one gas-oil separator to form a compressed sour gas stream;

c. at least one stabilizer for removing dissolved gases including hydrogen sulfide from the oil stream wherein the removed dissolved gases are compressed in the at least one compressor;

d. piping for feeding the portion of the associated gas stream from the upstream separator to a most downstream compressor of the at least one compressors such that the compressed sour gas stream and the portion of the associated gas stream are combined to form a compressed sour gas injection unit feed stream; and e. a sour gas injection unit for injecting the compressed sour gas injection unit feed stream into a subterranean formation.

13. The method of claim 12 further comprising, receiving in an eductor a portion of the associated gas stream from the upstream separator as a high pressure stream and the diverted acid gas stream from the feed line to the Claus unit as a low pressure stream such that a pressure-boosted stream leaves the eductor and is fed to the acid gas compressor, wherein the pressure-boosted stream has a lower concentration of hydrogen sulfide than the diverted acid gas stream.

14. The method of claim 12 wherein a portion of the portion of the associated gas stream from the upstream separator is fed to an intermediate stage of the acid gas compressor wherein a stream leaving the acid gas compressor has a lower concentration of hydrogen sulfide than the diverted acid gas stream, a pressure to match the compressed sour gas injection unit feed stream and wherein the stream leaving the acid gas compressor is combined with the compressed sour gas injection unit feed stream to form a stream to be injected into the subterranean formation.

15. The method of claim 11, 13 or 14 further comprising, responsive to a signal indicating the composition of the combined stream to be injected as determined by a gas chromatography sensor, controlling a composition of the stream to be injected into the subterranean formation to achieve a desired composition for enhanced oil recovery by adjusting a control valve for adjusting an amount of acid gas stream to be diverted, a control valve for adjusting an amount of the portion of the portion of the associated gas stream from the upstream separator fed to an intermediate stage of the acid gas compressor, and/or a control valve for adjusting an amount of the portion of the associated gas stream from the upstream separator as the high pressure stream received by the eductor.

* * * * *